UNITED STATES PATENT OFFICE.

JAMES W. PITTINOS, OF PHILADELPHIA, PENNSYLVANIA.

PROCESS OF COKING COAL-DUST FOR MANUFACTURING FUEL AND GAS.

SPECIFICATION forming part of Letters Patent No. 279,796, dated June 19, 1883.

Application filed April 25, 1881. (No specimens.)

*To all whom it may concern:*

Be it known that I, JAMES W. PITTINOS, a citizen of the United States, residing at Philadelphia, in the county of Philadelphia, State of Pennsylvania, have invented a new and useful Improvement in the Process of Utilizing Coal-Dust for Manufacturing Fuel and Gas, which improvement is fully set forth in the following specification.

In carrying out my invention I take one hundred parts bituminous coal reduced to a fine powder and about fifty parts of anthracite-coal dust or other hard-coal dust and intimately mix the same. The mass is then placed in a crucible or retort, or crucible in another retort, and firmly packed therein, and next subjected to a red heat, or temperature generally used for making illuminating-gas, for a period of, say, four or five hours, whereupon the particles of coal become consolidated and produce compact blocks or lumps.

For the purpose of making gas, the crucible with the firmly-packed mass of comminuted coal is placed in a suitable retort and subjected to a red heat, the evolved vapors being then treated as well known or required in gas-making.

It will be seen that by my process I unite the particles of anthracite dust by means of the bituminous coal and convert them into a solid, transportable, serviceable, and admirable fuel, which may be in large blocks or lumps.

In the manufacture of gas the hydrogen in the anthracite or other hard coal is also converted into illuminating-gas, the product whereof is large; and a larger amount of illuminating-gas is obtained from the bituminous coal, for the reason that the subjection of the mixture of the comminuted anthracite and bituminous coal in a crucible or retort, or crucible in a retort, to a red heat or higher temperature causes, first, the peripheral portions of the mass to become heated to a redness and consolidated, forming an envelope or crust which is solid, though porous in its nature, through which all of the volatile matters from the interior of the mass are required to pass, whereby there is a more thorough decomposition of said volatile matters into illuminating-gases, and the hydrogen of the anthracite coal is also converted into illuminating-gases. Furthermore, there is a less proportion of tar and other waste material than in the ordinary processes of making illuminating-gases from bituminous coal.

It is a well-known fact in chemistry that the vapor of any volatile body will be more thoroughly decomposed by passing through a porous body heated to redness than by any other means.

The particles of anthracite dust or other hard-coal dust employed vary in size from an impalpable powder to one inch in diameter. By "hard coal" I mean semi-bituminous coals and coke.

The principles in my process are that the bituminous coals in a minute state of division are the plastic or uniting elements of the anthracite in a minute state of division. The bituminous coals under the influence of a red heat become semi-fluid and envelop the anthracite particles in a mesh or net-work, which first expands under the influence of a red heat and fills the retort or crucible, and brings the coals into closer contact, until all the gas is evolved from the mass, during which the mass contracts powerfully and gradually from the periphery to the center and envelops the particles of anthracite within its folds. If the retort or crucible is of proper shape, the consolidated mass may be taken out with ease, as it is less in bulk than when packed in the retort or crucible, and may be turned out in a solid mass. The finer the bituminous coals are the firmer will be the product.

The principles involved in the extraction of illuminating-gases from anthracite dust are these: Under ordinary circumstances gas evolved from anthracite coals under the influence of heat is mostly light carbureted hydrogen, ($CH_2$,) which is of feeble illuminating-power. This, in my process, becomes mixed and united with naphthaline vapor and other carbo-hydrogens, containing more carbon than light carbureted hydrogen and olefiant gas, ($C_4H_4$,) which exist largely in bituminous coals. This produces an illuminating-gas equal in power to gas produced by heating bituminous coals *per se*, and in much larger quantities, and the light carbureted hydrogen ($CH_2$)

evolved from the anthracite is also converted into illuminating-gas of the same power as that made from bituminous coals alone. The finer the particles of the anthracite and bituminous are the more thoroughly and rapidly will the gas be evolved, and the firmer will be the product.

I am aware that it has been proposed to mix anthracite and bituminous coal in a broken or pulverized condition in the proportion of eighty-five per cent. of the former to fifteen per cent. of the latter, and that to this mixture water has been added and the whole treated in a retort for a period of about four days to obtain coke, ammoniacal liquors, and hydrocarburets. My process differs, in that to work it successfully I employ a larger per cent. of bituminous coal—at least thirty per cent. or more—use no water, dry materials being preferred, and treat the whole in a retort not over five hours.

Having thus described my invention, what I claim as new, and desire to secure by Letters Patent, is—

The process of coking coal-dust, which consists in mixing dry bituminous and hard coal dust, in the proportion of thirty per cent. or more of the former to seventy per cent. of the latter, and heating in a retort or crucible at a red heat for about four hours, whereby gases are distilled and blocks of coke produced, substantially as and for the purpose set forth.

JAS. W. PITTINOS.

Witnesses:
MONTGOMERY BURR,
ARCHIE R. PITTINOS.